INVENTOR
CYRIL G. TREADWELL
BY R. P. Morris
ATTORNEY

May 20, 1952 C. G. TREADWELL 2,597,043

AUTOMATIC REPLACEMENT OF DEFECTIVE REPEATERS IN HIGH-FREQUENCY ELECTRIC COMMUNICATION SYSTEMS

Filed July 12, 1949 3 Sheets-Sheet 2

INVENTOR
CYRIL G. TREADWELL
BY R. P. Morris
ATTORNEY

INVENTOR
CYRIL G. TREADWELL
BY R P Morris
ATTORNEY

Patented May 20, 1952

2,597,043

UNITED STATES PATENT OFFICE 2,597,043

AUTOMATIC REPLACEMENT OF DEFECTIVE REPEATERS IN HIGH-FREQUENCY ELECTRIC COMMUNICATION SYSTEMS

Cyril Gordon Treadwell, London, England, assignor to International Standard Electric Corporation, New York, N. Y., a corporation of Delaware Application July 12, 1949, Serial No. 104,306
In Great Britain July 13, 1948

17 Claims. (Cl. 250—15)

The present invention relates to arrangements for automatically replacing defective apparatus with spare apparatus in electric communication systems.

In radio or cable communication systems it is often the practice to provide a number of unattended repeater stations between two terminal stations, and in order to prevent service breakdowns of long duration it is essential to provide spare equipment at the stations and automatic means for substituting it for the defective equipment. Such substituting means is commonly operated in response to a failure of a signal output. However, in the case of a long chain of unattended repeaters, if one of them fails, there will be a temporary failure of the signal output at all the subsequent stations, which will cause all of them to change over to the spare equipment, and this is not desirable.

The principal object of the invention, therefore is to prevent this undesirable result, by discriminating at each station between a failure of signal output due to defective equipment at that station, and a failure due to defective equipment at a preceding station, so that a change-over occurs only at the station where the defect actually occurs.

This object is achieved according to the invention by providing an electric communication system in which signals are conveyed from a first station over a communication medium to a second station including normal signal receiving or repeating equipment and means adapted to operate in response to an abnormal reduction in the signal level for replacing the normal equipment by the spare equipment, comprising means at the said second station for preventing the operation of the replacing means except when the said abnormal reduction results from a defect at the said second station.

The embodiment which will be described to illustrate the invention is a multichannel radio pulse communication system, but the same principles are applicable to other communication systems which may operate over coaxial cables, for example.

The invention will be described with reference to the drawings, in which.

Figure 1:
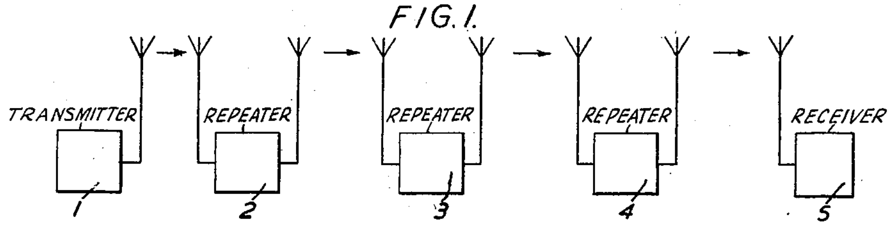
Fig. 1 shows a block schematic diagram of a radio communication system employing repeaters.

Fig. 1 shows a block schematic circuit of a radio communication system in which signals are conveyed from a transmitter 1 through three unattended repeater stations 2, 3 and 4 to a receiver 5. In order to avoid singing at the repeaters it is preferable to employ different wavelengths at each repeater for transmitting and receiving.

Since the repeater stations are unattended it is usual to provide a complete set of spare equipment at each of them, and an automatic switching device for substituting the spare equipment for the normal equipment when a fault occurs on the latter, in order to avoid a long interruption to the device. This switching device normally operates when the output from the transmitting antenna disappears or falls below some specified minimum.

However, it will be clear that if a fault occurs at station 2, for example, there will be a temporary loss of output at stations 3 and 4, and accordingly, the spare equipment will be substituted for the normal equipment at these stations also although no fault is present. This is an unnecessary and undesirable operation, and will be avoided by the arrangements according to the invention which will be described presently. In these arrangements in effect any repeater at which a loss of output occurs is immediately automatically tested, and if there is no fault, due to a repeater the automatic switching equipment is prevented from operating. Thus a substitution is made only at the repeater where the fault actually occurs.

Although Fig. 1 shows only a one way system identical arrangements may be made for both directions of a two way system.

Figure 2:
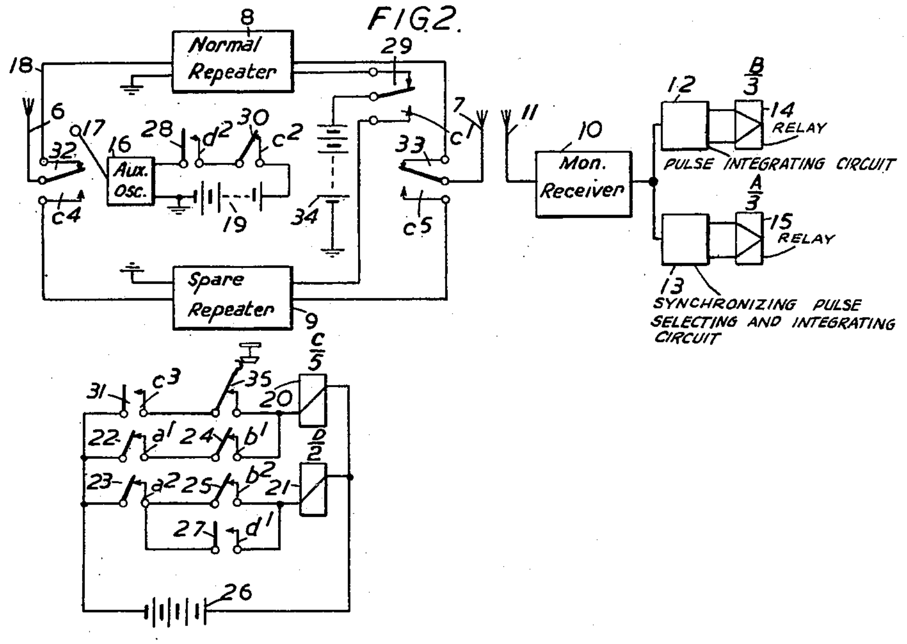
Fig. 2 shows a schematic circuit diagram of the arrangements at a repeater station according to the invention for replacing the normal equipment by spare equipment.

Fig. 2 shows the circuit arrangements at one of the repeaters 2, 3, 4 of Fig. 1, for a multichannel pulse communication system, of the kind in which each channel is represented by a train of regularly repeated pulse which are phase modulated in accordance with the corresponding signal. All channel pulses are alike in form, and the various channel pulse trains are interleaved with an additional unmodulated synchronising pulse train, the pulses of which differ in duration (or in some other suitable characteristic) from the channel pulses. For clearness it will be assumed that the duration of all the channel pulses is ½ microsecond, while the duration of the synchronising pulses is 2 microseconds, all pulses having the same amplitude. It will however, be clear that the arrangements which will be described may be easily adapted to operate with other kinds of multichannel pulse systems which employ synchronising pulses distinguishable from the channel pulses, and that it is not essential to employ phase modulation of the pulses.

The arrangements at the transmitting and receiving terminals will be afterwards described since they are both simplified forms of Fig. 2.

In Fig. 2, a principal receiving antenna 6 is connected to a transmitting antenna 7 through the normal repeater 8. This repeater may be of any suitable type adapted to receive the incoming pulse modulated carrier waves having a frequency $F_1$, and to supply to the antenna 7 amplified pulse modulated waves at a different frequency $F_2$. An exactly similar spare repeater 9 is also provided, which will be automatically substituted for the normal repeater 8 by means to be presently described, should a fault occur in the normal repeater.

As already explained, the existence of the fault is indicated by a failure, or abnormal reduction, of the radiation from the transmitting antenna 7. This failure is detected by a monitoring receiver 10 connected to an auxiliary antenna 11 placed close to the transmitting antenna 7. The receiver 10 demodulates the carrier waves and produces therefrom the combined train of channel and synchronising pulses which are supplied in parallel to a pulse integrating circuit 12 and to a synchronising pulse selecting and integrating circuit 13. The circuits 12 and 13 respectively control two relay windings 14 and 15, which will be denoted B and A respectively.

The relay circuits of the specification are drawn on the detached contact principle in which the relay contacts are separated from the windings by which they are controlled, and are placed at points in the circuit where the effects of their operation can be most easily understood. Each set of contacts is denoted by a numeral, and in addition by a small letter corresponding to the capital letter of the relay winding by which it is controlled, followed by a number to distinguish it from other sets of contacts controlled by the same relay winding. Thus, for example, the sets of contacts *a1* and *a2* are two different sets of contacts controlled by the relay $$\frac{A}{2}$$

the number under the straight line representing the number of contacts which are physically controlled by the relay. All sets of contacts are shown in the position assumed when there is no operating current in the corresponding winding.

The elements 12 and 13 will be described in detail later, but the integrating circuit 12 operates relay 14 (B) if any pulses are radiated from antenna 7, and the selecting circuit 13 operates relay 15 (A) only if the radiated pulses include synchronising pulses.

In order to test the normal repeater 8 when the antenna 7 fails to radiate any pulses, the auxiliary oscillator 16 is provided. This oscillator generates a carrier wave of frequency $F_1$ modulated with a train of unmodulated pulses similar to the combined train of pulses normally received by the antenna 6, except that the synchronising pulses are replaced by pulses exactly similar to the channel pulses. This oscillator supplies the pulse modulated waves to the input of the normal repeater by means of a loop 17 coupled to the corresponding input conductor 18 of the normal repeater.

The auxiliary oscillator 16 is normally not operating, since the high tension operating source 19 is normally disconnected.

The relays 14 and 15 (B and A) control two other relays 20 (C) and 21 (D), by means of the sets of contacts 22 (*a1*), 23 (*a2*) and 24 (*b1*) and 25 (*b2*). Under normal conditions of the relays A and B are both operated, and all these sets of contacts are open, so neither of the relays 20 or 21 will be operated. However, if a fault should occur at this or at an earlier station, there will be no output from the antenna 7, and accordingly relays A and B will both be released. The resulting closing of the contacts *a1*, *a2*, *b1*, and *b2* will supply operating current to relays C and D from the source 26.

These relays are both slow to operate, but relay C should be slower than relay D. Relay D therefore operates first, and closes contacts 27 (*d1*) and 28 (*d2*).

The closing of contacts *d2* switches on the operating source 19 for the oscillator 16. Pulses are now supplied to the normal repeater 8, and if it is operating satisfactorily these pulses will be picked up by the monitoring receiver 10 and will operate relay B but not relay A since there are no synchronising pulses. Thus relay C is deprived of operating current before it has had time to operate, by the opening of contacts *b1*.

The closing of the contacts *d1*, which are in parallel with the contacts *b2*, maintains relay D operated in spite of the opening of the contacts *b2* by the operation of relay B just mentioned.

If, however, the normal repeater is defective, no pulses will be received by the monitoring receiver and relays A and B remain released so that the relay C is given time to operate. This relay controls the sets of contacts 29 (*c1*), 30 (*c2*), 31 (*c3*), 32 (*c4*) and 33 (*c5*). Contacts *c4* and *c5*, are change over contacts which replace the normal repeater 8 by the spare repeater 9, and contacts *c1* transfer the operating source 34 to the spare repeater. Contacts *c2* disconnect the operating source 19 from the oscillator 16 and contacts *c3* maintain the relay C operated. A normal pulse train including synchronising pulses will now be picked up by monitoring receiver 10, relays A and B will both be operated and relay D will be released. The circuit now operates normally with the spare repeater 9 substituted for the normal repeater 8.

A push button key 35 is provided with normally closed contacts in series between the contacts *c3* and the relay C. This is provided to release the relay C after the fault in the repeater 8 has been cleared in order to restore the circuit to normal.

The relay C at any station should be slightly slower to operate than the relay D at the same station, as already stated. Furthermore the relay D at any given station should be slightly slower to operate than the relay D of the preceding station on the side towards the transmitting terminal. Suitable delay circuits may if desired, be associated with the relays to satisfy these requirements. Thus it will be clear that if a fault occurs at any given station, the auxiliary oscillator 16 at the next or any subsequent station on the side towards the receiving terminal will be prevented from being switched on, since the loss of pulses will release both the relays A and B at the subsequent station, but the relay B will be re-operated on receipt of pulses from the oscillator 16 at the subsequent station, before the relay D at the subsequent station has had time to operate, so that the contacts *b1* and *b2* at the subsequent station all open again, preventing either of the relays C or D from operating.

It should be noticed also that if a substitution has occurred at the station shown in Fig. 2, and a fault then occurs at an earlier station, a train of channel pulses without synchronising pulses will be received from the first station after the faulty one. This will cause the operation of relay D as before but the auxiliary oscillator 16 will not be switched on since contact *c2* will be open. As soon as the substitution occurs at the earlier station synchronising pulses are again received, and relay D is released.

Figure 3:
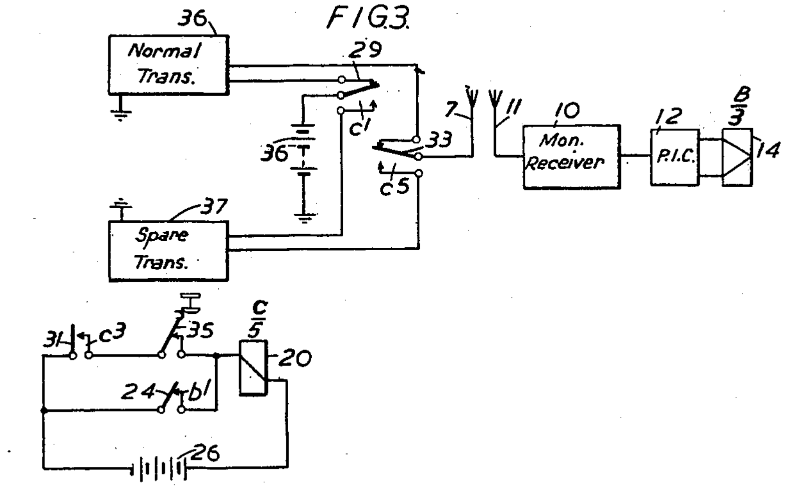
Fig. 3 shows the arrangements at the transmitting station.

The substitution arrangements at the transmitting terminal of the system are simplified because it is not necessary to test whether the fault may be at a preceding station. The arrangement is shown in Fig. 3 of which some of the parts are the same as in Fig. 2, and are given the same designations. It will be noted that the auxiliary oscillator 16 is not required, nor the synchronizing pulse integrating circuit 13 nor relays A and D. The repeaters 8 and 9 are replaced by a normal and a spare transmitter 36 and 37. There is, of course no receiving antenna 6.

It will be clear that if the normal transmitter 36 fails no pulses will be picked up by the monitoring receiver 10, and so the relay B will be released. This operates relay C by means of the contact *b1*, and this holds itself up by means of the contacts *c3* and substitutes the spare transmitter 37 for the normal transmitter 36 by means of contacts *c1* and *c5*, as before. When the fault has been cleared, the circuit is restored to normal by operating the key 35 to release the relay C.

Figure 4:
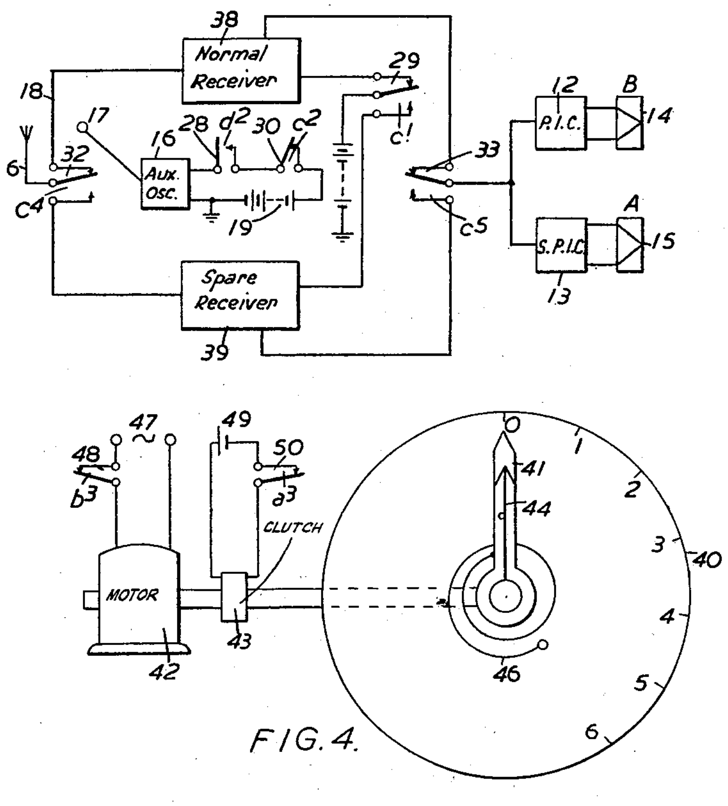
Fig. 4 shows the arrangements at the receiving station according to the invention.

The arrangements at the receiving terminal Fig. 4 are also very similar to those shown in Fig. 2 except that the repeaters 7 and 8 are replaced by normal and spare receivers 38 and 39. The monitoring receiver 10 and the antennas 7 and 11 are not required. The fixed contacts of the contact set 33 (*c5*) are connected to points in the receivers 39 and 40 where the combined pulse train has been recovered from the carrier wave, but has not yet been distributed to the various receiving channels and demodulated. The elements 12 and 13 are connected directly to the movable contact of the contact set *c5*. It will be evident that the elements 12 and 13 will be supplied with the same pulses as in Fig. 2.

In order to avoid complicating Fig. 4 the relay circuit shown in the lower part of Fig. 2 has been omitted, but it will be understood that an identical circuit will be used in connection with Fig. 4.

As in the case of Fig. 2, when a normal pulse train is applied to the elements 12 and 13 the relays A and B are both operated, and the connections shown in Fig. 4 are maintained. Moreover a failure causes the release of relays A and B and the switching on of the auxiliary oscillator 16 by closing of the contacts *d2*, as before. If the fault is not at the receiving terminal station, then relay B operates again and prevents the operation of relay C (shown in Fig. 2). If the fault is in the receiving equipment 38 then the relay B is not re-operated and relay C is permitted to operate, thus substituting the spare receiver 39 for the normal receiver 38, in the same manner as before.

Fig. 4 also includes a means for indicating at which of the stations the fault has occurred. It will be evident that since in radio communication systems the terminals may well be 300 miles apart with perhaps ten intermediate unattended repeater stations between, much time would be wasted in searching for the station where the fault had occurred.

Figure 5:
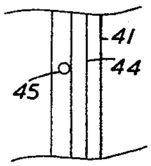
Fig. 5 shows an enlarged view of a detail of Fig. 4.

At the receiving station Fig. 4, there is accordingly provided a simple indicator comprising a disc 40 round which moves a radial needle 41 which is adapted to be rotated clockwise by a motor 42 through an electrically operated clutch 43. In front of the needle 41 is an indicating needle 44, which is engaged with the needle 41 in a manner more clearly seen from the enlarged view of parts of these needles shown in Fig. 5. The needle 41 carries a pin 45 which engages the lefthand side of the needle 44, so that this needle will be carried round by the needle 41 when it moves clockwise. When the clutch 43 is released, the needle 41 is returned to the zero position by the spring 46, leaving the indicating needle 44 behind. The indicating needle may be manually restored to zero by means of a suitable knob (not shown). Any other convenient means of coupling the two needles in the desired manner may be used.

The motor 42 is supplied from terminals 47 of the supply source through an extra pair of contacts 48 (*b3*) controlled by relay B. The motor will be switched on only when relay B is released. The clutch 43 is operated from a source 49 through an extra pair of contacts 50 (*a3*) controlled by relay A. It should be clear from what has been explained that when a fault occurs at one of the stations, the first effect will be the total disappearance of pulses from the output of the receiver 38. This releases both relays A and B causing contacts *a3* and *b3* to close, and to start the motor 42 and engage the clutch 43 at the same time. The needle 41 rotates, carrying the needle 44 with it. Moreover as soon as the D relay operates at the next station after the defective station, a train consisting of channel pulses only will be received, and the relay B then operates and stops the motor. In the meantime the needles have moved round to a point determined by the delay in the operation of the D relay at the defective station. It has already been explained that the D relay at each station should be adjusted to give a slightly greater delay time than that at the preceding station, counting from the transmitting end.

It will be evident that the further the needles are carried round, the nearer is the fault to the receiving station, and the motor speed is adjusted so that a suitable scale is produced on the dial 40, which may be marked with numbers indicating the various stations on the route.

When the C relay at the defective station operates, the substitution is made and the synchronising pulses are again received at the receiving terminal (Fig. 4). Relay A then operates, releasing the clutch 43 so that the needle 41 flies back to zero, leaving the needle 44 behind to indicate the defective station. In this way the operator at the receiving terminal can tell whether the substitution has been completed at the faulty station.

If the defect is at the transmitting station, Fig. 3, the loss of the pulses at the receiving station, Fig. 4, will start the indicator needles as already explained, but as there is no D relay at the transmitting station, the substitution thereat of the spare equipment will restore the synchronising pulses and the channel pulses so that the needle 41 will stop and fly back to zero at once leaving the indicating needle 44 behind. The C relay at the transmitting station Fig. 3, should therefore be given a shorter operation delay than the D relay of the first repeater station.

One of the advantages of the arrangement which has been described is that if the monitoring receiver 10 at any station should fail, a change over to the spare equipment will occur because both A and B relays will be released. A fault will be signalled to the receiving terminal as before, and the operator on visiting the station will easily find that the fault is in the monitoring receiver.

The repeater which supplies a train of pulses from its local oscillator is always the one following the faulty station, as already explained, so the indicator should be numbered accordingly. A fault in the local oscillator at the faulty station will not affect the indication since no pulses can be indicated by the faulty station, but a fault in the local oscillator of the next station will indicate a fault at that station. When the operator visits that station he will find the repeater normal and will therefore check the operation of the local oscillator.

It should be understood that the antenna switching contacts *c*4 and *c*5 are intended to represent diagrammatically antenna switches of suitable design ultimately controlled by the C relay. If necessary the antenna switches may actually be operated from the C relay by intermediate relays (not shown) of suitable pattern.

Figure 6:
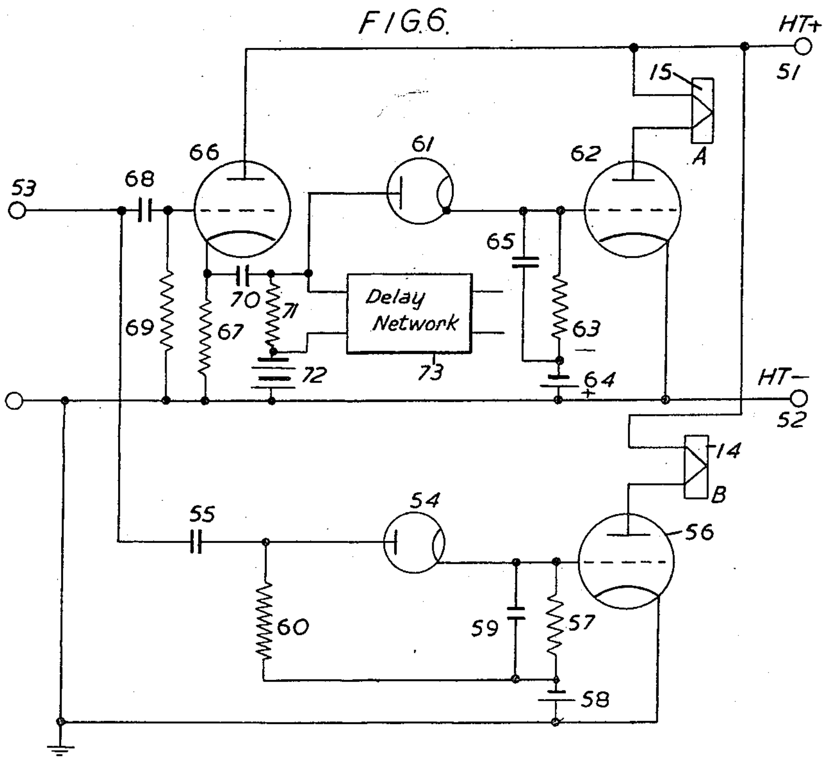
Fig. 6 shows a detailed schematic circuit diagram of suitable pulse integrating circuits employed in Figs. 2, 3, and 4.

Fig. 6 shows details of the integrating circuits 12 and 13 shown in Figs. 2 and 4. Both circuits may be operated from the same high tension source (not shown) the terminals for which are numbered 51 (positive) and 52 (negative and preferably connected to ground). The pulses obtained from the monitoring receiver 10 (Fig. 2) or from the switch contacts 33 (*c*5) in Fig. 3 will be applied in positive sense to terminal 53. This terminal is connected in parallel to the pulse integrating circuit which is shown in the lower half of Fig. 6, and to the synchronising pulse integrating circuit which is shown in the upper half of Fig. 6. The pulse integrating circuit comprises a rectifying diode 54 having its anode connected to terminal 53 through a blocking condenser 55 and to its cathode connected to the control grid of a valve 56. The cathode of this valve is connected to ground and its anode is connected through the B relay winding 14 to terminal 51.

The control grid is connected through diode load resistance 57 to a grounded negative bias source 58 of suitable potential to bias the valve to the cut-off point so that normally no current flows through the relay 14. The diode load is shunted by the usual condenser 59. The anode of the diode 54 is also connected to the source 58 through a resistance 60.

It will be clear that when a train of pulses is applied to terminal 53, it will be rectified in the usual way, whether it contains synchronising pulses or not, and the arrangements should be such that a positive rectified voltage is applied to the control grid of the valve 56 sufficient to overcome the bias potential and to unblock the valve, thereby operating the B relay 14.

The circuit of the synchronising pulse integrating circuit in the upper half of Fig. 6 is the same in principle as the circuit just described, and includes a diode 61, a valve 62, a load resistance 63, a bias source 64 and a condenser 65, similar to the elements 54, 56, 57, 58 and 59, respectively, the anode of the valve 62 being connected to terminal 51 through the A relay 15. There is, however, in addition a circuit for selecting the synchronising pulses including a valve 66 arranged as a cathode follower with its anode connected directly to terminal 51 and its cathode to ground through a resistance 67. The control grid is connected to terminal 53 through a blocking condenser 68, and to ground through a leak resistance 69.

The cathode of the valve 66 is connected through a blocking condenser 70 to the anode of the diode 61 and also to a resistance 71, connected to ground through a bias source 72. The input terminals of a delay network 73 are connected across the resistance 71 and the output terminals are left open. This delay network may consist, for example, of an artificial transmission line comprising a number of tandem connected sections of a low pass filter, and the resistance 71 should be chosen so that the input terminals of the network are terminated by its characteristic impedance. It will be clear that pulses applied through the valve 66 will be transmitted through the delay network and will be reflected at the open end without change of sign.

The delay introduced by the network 73 should be about one quarter of the duration of the synchronising pulses, so that the leading edge of a reflected synchronising pulse returns to the input terminals of the delay network when only about half the pulse has passed, so that practically a double amplitude will be produced for the period of the latter half of the pulse. The bias source 72 should be of such higher potential than the bias source 64, that the diode 61 is blocked against pulses of normal amplitude, but will pass pulses having the double amplitude produced by the combination of a synchronising pulse with the corresponding reflected pulse.

The ordinary channel pulses are of much shorter duration than the synchronising pulses, so that a reflected pulse corresponding to a channel pulse will return to the input terminals of the network 73 after the original pulse has disappeared so that no double amplitude can be produced. It follows that only the synchronising pulses can be rectified by the diode 61, and they will operate the A relay 15 through the valve 62 exactly in the same way as in the lower half of Fig. 6. It will be clear, also, that if the pulse train applied to terminal 53 contains no synchronising pulses, the A relay 15 will not be operated.

It will be evident that at the transmitting station (Fig. 2) the synchronising pulse integrating circuit is not required, so only the lower half of Fig. 6 including the elements 54 to 60, and the relay 14 will be provided.

It will be understood that the bias sources 58, 64, and 72 have been shown conventionally as batteries for clearness, but they could be provided in any suitable way, and could for example be all derived from a single source by means of potentiometers. The valves shown could be pentodes, for example, and other obvious modifications of the arrangements could be made.

Although a radio communication system employing modulated pulses has been described to illustrate the invention, similar principles can be applied to systems operating over cable or wire circuits and to systems not employing pulses for conveying the signals. The basic requirements are that a generator corresponding to the oscillator 16 should be provided at a repeater or receiving station, this generator being designed to produce test signals which are similar to the signals normally received, but which have some characteristic difference by which they can be distinguished from normal signals. Then some suitable means is necessary for testing the signal level at the output or at some other convenient point of the repeater or receiving apparatus, such means including a device corresponding to 12 responsive both to the normal signals and to the test signals, and another device corresponding to 13 responsive only to the normal signals. These devices will be designed to control a relay system such as that described for carrying out the required operations. It will be clear that the relay system illustrated in the figures is only one of many which might be used, and the principles employed in designing relay circuits to perform any desired series of operations are well known. Likewise the circuits shown in Fig. 6 are also conventional, and the other conventional circuits suitable for distinguishing between the normal and test signals can easily be designed by those skilled in the art for systems not employing pulses.

What is claimed is:

1. In an electric communication system comprising a plurality of stations adapted for intercommunication, at least one of said stations including normal signaling equipment and spare signaling equipment and switching means adapted to operate in response to an abnormal signaling condition for replacing the normal equipment by the spare equipment comprising first signal responsive means, and a second signal responsive means including a source of test signals controlled by said second signal responsive means to render said switching means inoperative if the abnormal signaling condition results from a defect in the system at a point other than said one station.

2. A system according to claim 1, in which said first signal responsive means includes means for measuring the signal level at a point in said local equipment, means responsive to change in signal level for causing the application of said test signals to said equipment and said second signal responsive means includes means connected to said switching means for rendering the switching means inoperative if normal signal level is obtained by said signal responsive means in response to the test signals.

3. An electric communication system in which signals are conveyed from a transmitting station through a chain of repeater stations to a receiving station, normal signaling equipment at said stations, spare signaling equipment at a plurality of said stations, and signal responsive means at the plurality of stations operative in response to an abnormal signaling condition at a specified point in the normal signaling equipment for replacing the normal equipment by the spare equipment, a source of local test signals at the plurality of stations, means also controlled by said signal responsive means for testing said normal equipment with test signals, and means for rendering said switching means inoperative if a normal signaling condition is received in response to the test signals.

4. A system according to claim 3 in which means connected to the line and responsive to a signal condition resulting from a replacement at the stations is provided at the receiving station and adapted to indicate the particular station at which a replacement has occurred.

5. A system according to claim 3 in which the signal responsive means is operative in response to an abnormal reduction in signal strength at a specified point in the normal signaling equipment.

6. A radio multi-channel communication system in which at least one train of signal modulated channel pulses and a train of synchronizing pulses distinguishable from the channel pulses are simultaneously transmitted from a transmitting station through a series of repeater stations to a receiving station, comprising spare signaling equipment at a plurality of said stations, means at said plurality of stations adapted to generate a train of test pulses similar to the pulse train normally received from the preceding station except that each synchronizing pulse is replaced by a pulse similar to the channel pulses, and signal responsive means at each station connected to a point in the signaling equipment thereat and responsive to an abnormal signaling condition for applying the train of test pulses to the normal signaling equipment and including means for replacing the normal signaling equipment by the spare signaling equipment if an abnormal signaling condition is received in response to the test signals, and means at a station succeeding the station at which the test signals are applied for rendering said signal responsive means at the succeeeding station inoperative in response to the test signals applied at a preceding station.

7. A system according to claim 6 in which the signal responsive means comprises at least two devices connected to a point other than the input of the signalling equipment, one of said devices responding only to the pulse trains normally received by the station, a second one of said devices responding equally to both the normally received pulse train and the pulse train produced by the test source, means controlled by said one device for applying the test pulse train to the input of the signaling equipment in the absence of a normal pulse train and means controlled by the second device for rendering said replacing means inoperative if pulses are received by said second device in response to the application of applied test pulses.

8. In a radio multi-channel communication system in which a plurality of trains of signal modulated channel pulses and a train of synchronizing pulses distinguishable from the channel pulses are intermixed and transmitted from a transmitting station through a series of repeater stations to a receiving station, normal signaling equipment at each station, replacement signaling equipment at a plurality of said stations, means including switching means at each of said plurality of stations adapted to disconnect said normal signaling equipment and to connect in its place the corresponding replacement equipment in the absence of received signals, a source of test signals at each of said plurality of stations, means associated with each test source for connecting said source to the input of the corresponding normal signaling equipment, a pair of signal responsive devices at each of said plurality of stations and connected to a point in the associated signaling equipment other than the input thereof, one of said devices responding only to the pulse train normally received by the station, the other of said devices responding equally to the normally received pulse train and the test pulse train, means controlled by said first device for connecting said test source to said equipment, and means controlled by said second device to render said replacement means inoperative in response to received test pulses from said source.

9. A system according to claim 8 in which the replacing means includes a slow acting relay controlled by both devices and adapted to operate to effect the replacement of the normal equipment by the spare equipment a predetermined time after the disappearance of the normal pulse train.

10. A system according to claim 8 in which the replacing means includes a slow acting relay controlled by both devices and adapted to operate to effect the replacement of the normal equipment by the spare equipment a predetermined time after the disappearance of the normal pulse train and a second slow acting relay connected to the second device and operating more quickly than the first relay, the second relay being controlled by the second device and adapted to render the first relay inoperative when test pulses are received by said second device.

11. A system according to claim 8 in which the replacing means includes a slow acting relay controlled by both devices and adapted to operate to effect the replacement of the normal equipment by the spare equipment a predetermined time after the disappearance of the normal pulse train, a second slow acting relay connected to the second device and operating more quickly than the first relay, the second relay being controlled by the second device and adapted to render the first relay inoperative when test pulses are received by said second device, the first relay including holding means for maintaining itself in operated condition when once operated and means controlled by said switching means for rendering said holding means ineffective upon restoration of normal conditions.

12. In an electric communication system in which signals are conveyed from a transmitting station through a chain of repeater stations to a receiving station, normal signaling equipment and spare signaling equipment at the stations, means for controlling the replacement of said normal equipment by said spare equipment at each station comprising a source of test signals, switching means for connecting said source to the input of the normal equipment, a first device connected to the signaling eqiupment and responsive only to normal signals received by said station and adapted to operate said switching means upon failure to receive normal signals, a second device connected to the signaling equipment equally responsive to both normal signals received by the stations and test signals transmitted by the signaling equipment from the source of test signals, replacement switching means for disconnecting said normal equipment and connecting in its place the spare equipment, a first slow acting relay controlled by both devices adapted to operate said replacement switching means a specified time after the disappearance of normal signals, and a second slow acting relay controlled by said second device and operating quicker than said first relay, said last named relay being adapted to render inoperative said first relay when test signals are received, the operating delay of said second relay at the various stations being progressively increased with the distance from the transmitting station.

13. A system according to claim 12 in which a slow acting relay is provided at the transmitting station for effecting the replacement of the normal equipment by the spare equipment, the operating delay of said relay being less than the operating delay of said second relay at the first repeater station.

14. A system according to claim 12 comprising means at the receiving station connected in circuit with said repeater stations and responsive to a condition in said circuit resulting from replacement at one of the stations for indicating the particular station where replacement of equipment has occurred.

15. A system according to claim 12 comprising means at the receiving station connected in circuit with said repeater stations and responsive to a condition in said circuit resulting from a replacement at one of the stations for indicating the particular station where a replacement of eqiupment has occurred, said indication being determined by the delay of the second relay in said station.

16. A system according to claim 12 in which at a repeater station the pulses are derived from the output antenna by means of an auxiliary antenna connected to a monitoring receiver, and at the receiving station the pulses are derived from a point in the normal or spare receiver after recovery of the pulses from the carrier wave but before separation of the respective channel pulse trains from the interleaved train of pulses.

17. In an electric communication system a first and a second station, a communication channel for transmitting signals from the first station to the second station, normal signaling equipment and spare signaling equipment at said second station, switching means adapted to disconnect said normal equipment and connect in its place the spare equipment in response to an abnormal signaling condition, equipment testing means, and signal responsive means connected to the normal equipment and adapted to effectuate said equipment testing means to place said normal signaling equipment under a test condition in responsive to the abnormal signaling condition, and test responsive means connected to the normal equipment and adapted to render said switching means inoperative upon the normal functions of said signaling equipment under said test condition.

CYRIL GORDON TREADWELL.

REFERENCES CITED

The following references are of record in the file of this patent:

UNITED STATES PATENTS

| Number | Name | Date |
|---|---|---|
| 2,017,126 | Kroger | Oct. 15, 1935 |
| 2,229,089 | Kinsburg | Jan. 21, 1941 |
| 2,296,384 | Hansell | Sept. 22, 1942 |
| 2,379,069 | Dysart | June 26, 1945 |
| 2,396,990 | Dysart | Mar. 19, 1946 |